(12) United States Patent
Vålberg

(10) Patent No.: US 12,061,098 B2
(45) Date of Patent: Aug. 13, 2024

(54) AGRICULTURAL MACHINE COMPRISING SENSORS

(71) Applicant: VÄDERSTAD HOLDING AB, Väderstad (SE)

(72) Inventor: Stefan Vålberg, Linköping (SE)

(73) Assignee: VÄDERSTAD HOLDING AB, Väderstad (SE)

( * ) Notice: Subject to any disclaimer, the term of this patent is extended or adjusted under 35 U.S.C. 154(b) by 0 days.

(21) Appl. No.: 17/797,704

(22) PCT Filed: Jan. 27, 2021

(86) PCT No.: PCT/EP2021/051827
§ 371 (c)(1),
(2) Date: Aug. 4, 2022

(87) PCT Pub. No.: WO2021/156118
PCT Pub. Date: Aug. 12, 2021

(65) Prior Publication Data
US 2023/0103915 A1    Apr. 6, 2023

(30) Foreign Application Priority Data

Feb. 5, 2020 (SE) .................... 2050118-5

(51) Int. Cl.
*G01D 18/00* (2006.01)
*A01C 15/00* (2006.01)

(52) U.S. Cl.
CPC ........... *G01D 18/00* (2013.01); *A01C 15/006* (2013.01)

(58) Field of Classification Search
CPC .... G01D 18/00; A01C 15/006; A01C 17/006; A01C 7/105; A01C 14/00; A01B 76/00; A01D 41/127
See application file for complete search history.

(56) References Cited

U.S. PATENT DOCUMENTS

| | | | | |
|---|---|---|---|---|
| 5,969,340 A | * | 10/1999 | Dragne | G06M 1/101 250/223 R |
| 9,113,591 B2 | * | 8/2015 | Shivak | A01C 7/082 |

(Continued)

FOREIGN PATENT DOCUMENTS

| | | |
|---|---|---|
| EP | 2816813 A1 | 12/2014 |
| EP | 3152997 A1 | 4/2017 |

OTHER PUBLICATIONS

International Search Report mailed Apr. 19, 2021, issued in corresponding International Patent Application No. PCT/EP2021/051827, filed Jan. 27, 2021, 3 pages.

*Primary Examiner* — Shelby A Turner
*Assistant Examiner* — Yaritza H Perez Bermudez
(74) *Attorney, Agent, or Firm* — Davis Wright Tremaine LLP

(57) ABSTRACT

In accordance with one or more embodiments herein, an agricultural machine (100) comprising sensors is provided. The agricultural machine (100) comprises a number of sensor programming devices (110), each comprising a unique set of sensor programming instructions, and is arranged to comprise one single corresponding sensor device (120) for each of the sensor programming devices (110). Each sensor programming device (110) is mounted in a programming position (115) adjacent a sensor position (125) for the corresponding sensor device (120), and each sensor device (120) is arranged to be mounted in the sensor position (125) and automatically receive the sensor programming instructions from the corresponding sensor programming device (110). This ensures that if a sensor device (120) is moved from one sensor position (125) to another sensor position (125), it automatically receives a different set of programming instructions.

18 Claims, 5 Drawing Sheets

(56) References Cited

U.S. PATENT DOCUMENTS

| | | | |
|---|---|---|---|
| 9,313,944 B1 * | 4/2016 | Faivre | A01M 21/02 |
| 9,565,798 B2 * | 2/2017 | Baker | G01F 1/661 |
| 10,452,974 B1 * | 10/2019 | Cosic | G06N 3/084 |
| 10,548,259 B2 * | 2/2020 | Heathcote | A01C 7/20 |
| 10,650,621 B1 * | 5/2020 | King | G07C 5/0816 |
| 2013/0311140 A1 | 11/2013 | Schechter | |
| 2015/0068320 A1 | 3/2015 | Stewart | |
| 2019/0259108 A1 * | 8/2019 | Bongartz | G06Q 10/0639 |
| 2022/0187927 A1 * | 6/2022 | Vålberg | G06F 3/0219 |
| 2023/0103915 A1 * | 4/2023 | Vålberg | G01D 18/00 702/104 |

* cited by examiner

AGRICULTURAL MACHINE COMPRISING SENSORS

CROSS-REFERENCE TO RELATED APPLICATIONS

The present disclosure is a 371 U.S. National Phase of International Patent Application No. PCT/EP2021/051827, filed Jan. 27, 2021, entitled "AGRICULTURAL MACHINE COMPRISING SENSORS," which claims priority to Swedish Patent Application No. 2050118-5, filed Feb. 5, 2020, entitled "2050118-5," the contents of which are incorporated herein by reference in their entirety.

TECHNICAL FIELD

The present disclosure relates generally to agricultural machines comprising sensors.

BACKGROUND

Agricultural machines use sensors for measuring many different things. For e.g. an air seeder, sensors may measure parameters such as how fast the seeder is moving, the flow of material (seed), and the amount of seed that remains in the seed tank on the seeder. Other agricultural machines comprising sensors may e.g. be drills, combines, cultivators, plows, and manure spreaders. On such agricultural machines, the sensors may also, or alternatively, measure other parameters.

Problems with the Prior Art

Since each of the sensors on an agricultural machine is normally specific for its intended purpose, a farmer needs to have spares for each sensor, or wait until a new sensor is delivered if a sensor breaks down. There is then always a risk that the farmer orders the wrong sensor, or has the wrong sensor delivered, or mounts the sensor in the wrong position.

There is thus a need for an improved agricultural machine.

SUMMARY

The above described problem is addressed by the claimed agricultural machine, which may comprise a number of sensor programming devices, each comprising a unique set of sensor programming instructions, and be arranged to comprise one single corresponding sensor device for each of the sensor programming devices, wherein each sensor programming device is mounted in a programming position adjacent a sensor position for the corresponding sensor device, and each sensor device is arranged to be mounted in the sensor position and automatically receive the unique set of sensor programming instructions from the corresponding sensor programming device, so that if a sensor device is moved from one sensor position to another sensor position, it automatically receives a different set of programming instructions.

The above described problem is further addressed by the claimed method for arranging sensor devices on an agricultural machine. The method may comprise: arranging a number of sensor programming devices, each comprising a unique set of sensor programming instructions, in a programming position adjacent a sensor position for a corresponding sensor device; for each sensor programming device, arranging one single corresponding sensor device in the sensor position; and for each sensor programming device, transferring the unique set of sensor programming instructions automatically from the sensor programming device to the sensor device, so that if a sensor device is moved from one sensor position to another sensor position, it automatically receives a different set of programming instructions.

This enables the use of the same universal sensor device in each sensor position, so that a farmer only needs to have spares for this universal sensor device. This also provides the possibility to move a sensor device from a less vital to a more vital sensor position, if a sensor device in a very vital sensor position breaks down and the farmer has no spare. When the sensor device has been moved, the sensor device only needs to be initialized (e.g. by the system being restarted) so that the sensor device receives the unique set of sensor programming instructions it needs to perform the necessary functions in the new sensor position.

In embodiments, the automatic transferring of the unique set of sensor programming instructions from a sensor programming device to a sensor device takes place when the agricultural machine is started. However, there may be a sensor initialization routine that may instead be run at any suitable point in time. Alternatively or additionally, there may be sensor initialization means on each sensor device, so that the unique set of sensor programming instructions are automatically transferred from a sensor programming device to a sensor device when e.g. a button or a switch on the sensor device is actuated.

In embodiments, a sensor device that is arranged to be mounted in a sensor position comprises a reader that automatically reads the unique set of sensor programming instructions from the sensor programming device.

In embodiments, at least one of the sensor programming devices comprises a passive RFID tag comprising sensor programming instructions, and the corresponding sensor device comprises an RFID reader. The automatic transferring of the unique set of sensor programming instructions may then comprise activating the RFID tag and reading the unique set of sensor programming instructions using the RFID reader.

In embodiments, at least one of the sensor programming devices comprises a visual code comprising sensor programming instructions, such as e.g. a bar code or a QR tag, and the corresponding sensor device comprises an optical reader. The automatic transferring of the unique set of sensor programming instructions may then comprise reading the unique set of sensor programming instructions using the optical reader.

In embodiments, at least one of the sensor programming devices comprises a number of magnets, where the position pattern of the magnets comprises the sensor programming instructions, and the corresponding sensor device comprises a reader that detects the position pattern of the magnets. The automatic transferring of the unique set of sensor programming instructions may then comprise reading the unique set of sensor programming instructions by detecting the position pattern of the magnets.

In embodiments, each of the sensor devices comprises a radar sensor, an IR sensor, an angle sensor, and/or an accelerometer. There may of course also be other types of sensor devices on the agricultural machine.

In embodiments, each of the sensor devices measures at least one of a speed of movement of the agricultural machine, a level of substance filling in a tank of the agricultural machine, a speed of feeding out substance from the agricultural machine, and/or a distance to surrounding objects. There may of course also be other types of sensor devices, measuring other parameters, on the agricultural machine.

In embodiments, the unique set of sensor programming instructions in each sensor programming device is fixed and cannot not be updated by any system in the agricultural machine.

In this application, the term "agricultural machine" means any type of implement that may be used for agriculture and comprises at least one sensor device. It may be a vehicle comprising its own driving means, or it may be an implement intended to be pulled or carried by a vehicle such as e.g. a tractor.

In this application, the feature that the programming position is "adjacent" a sensor position means that the programming position is close enough to ensure that a reader arranged in a sensor device that is mounted in the sensor position is able to read the unique set of sensor programming instructions from the sensor programming device that is mounted in the programming position, without the risk of accidentally reading the sensor programming instructions from a sensor programming device mounted in another programming position.

A unique set of sensor programming instructions may be unique just in relation to the unique sensor identification code or number comprised in the unique set of sensor programming instructions. The rest of the sensor programming instructions may be the same for two different unique sets of sensor programming instructions. The agricultural machine may of course also comprise sensor programming devices that do not each comprise a unique set of sensor programming instructions.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

There are often a number of sensors on an agricultural machine. For e.g. an air seeder, sensors may measure parameters such as how fast the seeder is moving, the flow of material (seed), and the amount of seed that remains in the seed tank on the seeder. Other agricultural machines comprising sensors may e.g. be drills, combines, cultivators, plows, and manure spreaders. Since each of the sensors used on an agricultural machine is normally specific for its intended purpose, a farmer needs to have spares for each sensor, or wait until a new sensor is delivered if a sensor breaks down. There is then always a risk that the farmer orders the wrong sensor, or has the wrong sensor delivered, or mounts the sensor in the wrong position.

The claimed invention solves this problem by using programmable universal sensor devices, that are the same in each position, and programming each of these sensor devices for its specific purpose. The sensor devices are preferably programmed in position, using sensor programming devices comprising unique sets of sensor programming instructions. The agricultural machine may of course also comprise "normal" sensors, in addition to the claimed sensor devices. Embodiments of the disclosed solution are presented in more detail in connection with the figures.

Figure 1:
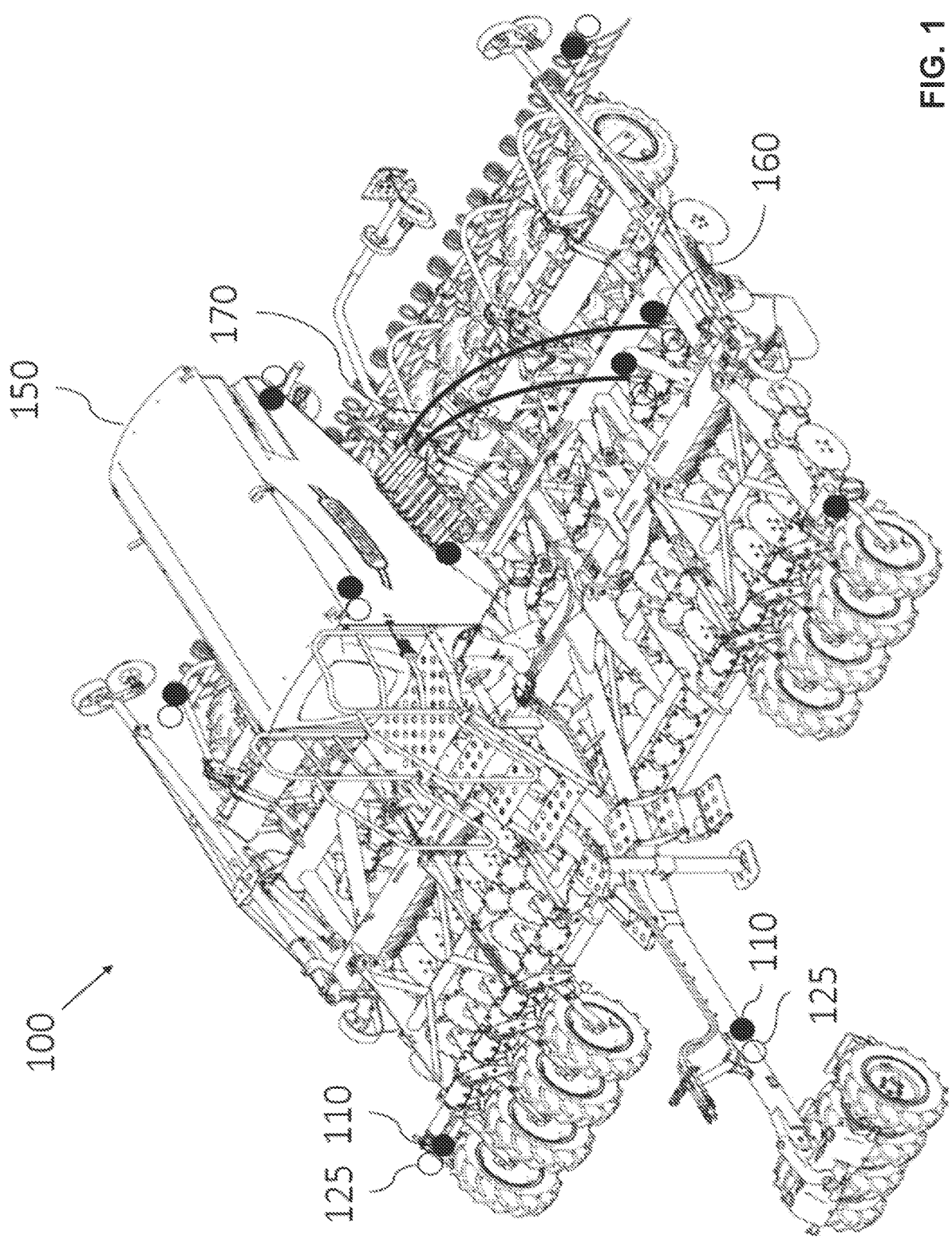
FIG. 1 shows an agricultural machine comprising sensors, in accordance with one or more embodiments described herein.
Figure 2:
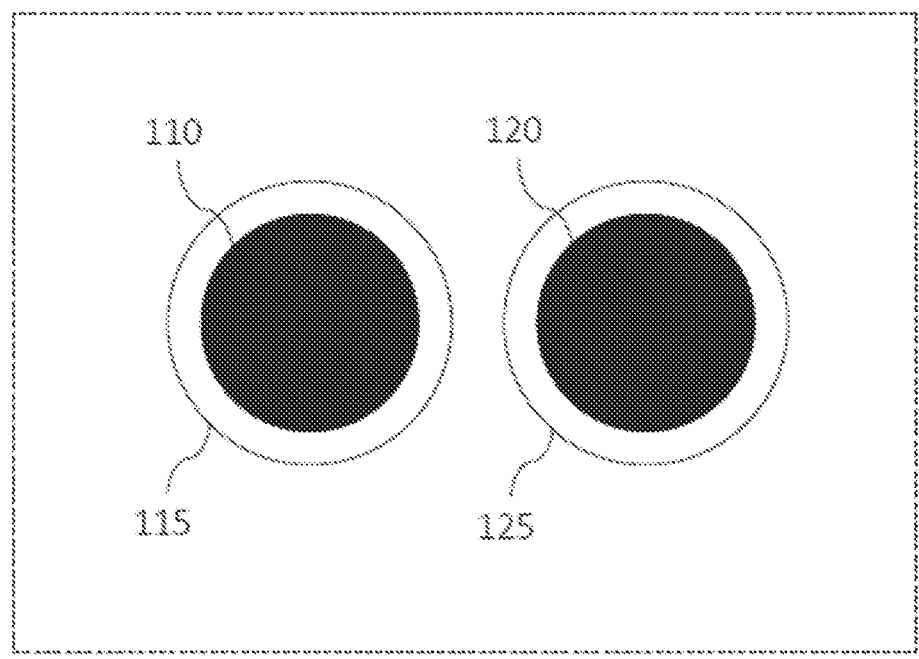
FIG. 2 schematically illustrates a sensor device and a sensor programming device, in accordance with one or more embodiments described herein.
Figure 3:
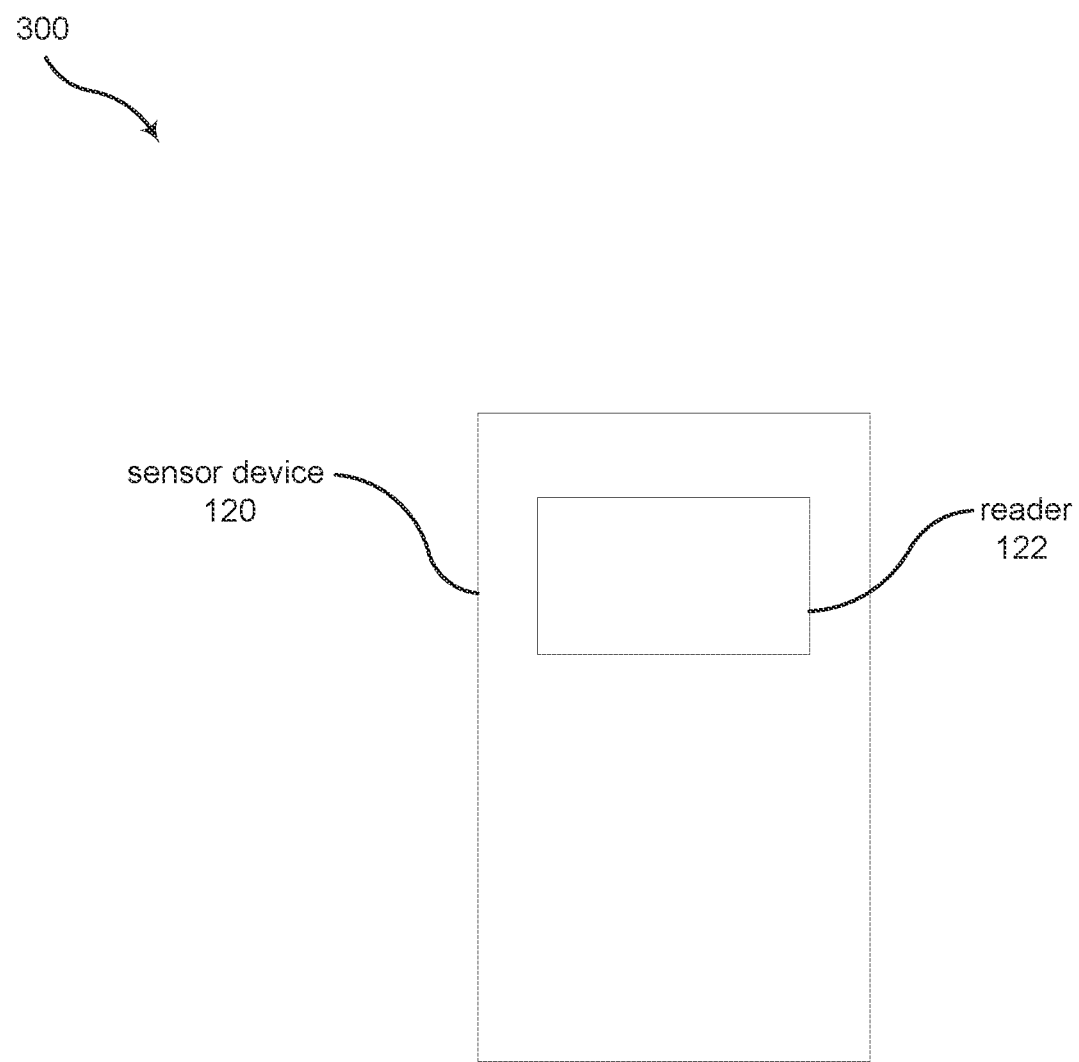
FIG. 3 schematically illustrates a sensor device, in accordance with one or more embodiments described herein.

FIG. 1 shows an agricultural machine 100, FIG. 2 schematically illustrates a sensor programming device 110 and a sensor device 120, and FIG. 3 schematically illustrates a sensor device 120, in accordance with one or more embodiments described herein.

On the agricultural machine 100 shown in FIG. 1, there are a number of sensor positions 125 where sensor devices 120 may be mounted. As illustrated schematically in FIG. 2, for each sensor position 125, there is a sensor programming device 110 that is mounted in a programming position 115, located next to the sensor position 125 for the corresponding sensor device 120. Each of the sensor programming devices 110 comprises a unique set of sensor programming instructions for the corresponding sensor device 120. Each sensor device 120 preferably automatically receives the unique set of sensor programming instructions from the corresponding sensor programming device 110, when the sensor device 120 is mounted in the sensor position 125, so that if a sensor device 120 is moved from one sensor position 125 to another sensor position 125, it automatically receives a different set of programming instructions.

This enables the use of the same universal sensor device 120 in each sensor position 125, so that a farmer only needs to have spares for this universal sensor device 120. This also provides the possibility to move a sensor device 120 from a less vital to a more vital sensor position 125, if a sensor device 120 in a very vital sensor position 125 breaks down and the farmer has no spare. When the sensor device 120 has been moved, the sensor device 120 only needs to be initialized (e.g. by the system being restarted) so that the sensor device 120 receives the unique set of sensor programming instructions it needs to perform the necessary functions in the new sensor position 125. This ensures that if a sensor device 120 is moved from one sensor position 125 to another sensor position 125, it automatically receives a different set of programming instructions.

The sensor positions 125 illustrated in FIG. 1 are intended for sensor devices 120 that measure different parameters.

The sensor positions 125 located in the corners of the agricultural machine 100 may e.g. be used for mounting sensor devices 120 that measure the distance above the ground for each corner of the agricultural machine 100—this may be especially useful on uneven fields.

The sensor position 125 located near the front end of the agricultural machine 100 may e.g. be used for mounting a sensor device 120 that measures the speed of movement of the agricultural machine 100 in relation to the ground.

Sensor positions 125 near the rear end of the agricultural machine 100 may e.g. be used for mounting sensor devices 120 that detect obstacles when moving the agricultural machine 100 rearwards.

Sensor positions 125 on a tank 150 of the agricultural machine 100 may e.g. be used be used for mounting sensor devices 120 that measure the filling level of the tank 150.

Sensor positions 125 near an outlet 160 (e.g. a seed outlet) close to the ground and/or near an outlet from a tank 150 of the agricultural machine 100 may e.g. be used be used for mounting sensor devices 120 that monitor the flow of substance such as e.g. fertilizer or seed from the tank 150 of the agricultural machine 100. FIG. 1 shows two hoses 170 (e.g. seed hoses) running from outlets on the tank 150 to outlets 160. There is normally a hose 170 for each outlet 160, but for clarity only two hoses 170 are shown in FIG. 1.

The agricultural machine may of course comprise a number of different sensors that measure exactly the same parameters in exactly the same way. However, in order for the system to be able to differentiate between different sensors, each sensor needs to have a unique sensor identification code or number. Two different unique sets of sensor programming instructions may thus differ only in the unique sensor identification code or number comprised in the unique set of sensor programming instructions. The agricultural machine may of course also comprise sensor programming devices that do not each comprise a unique set of sensor programming instructions.

Each sensor programming device 110 may comprise e.g. a passive RFID tag comprising sensor programming instructions, a visual code comprising sensor programming instructions, such as e.g. a bar code or a QR tag, and/or a number of magnets, where the position pattern of the magnets comprises sensor programming instructions.

Each sensor device 120 may comprise a reader 122, as illustrated schematically in FIG. 3. The reader 122 may e.g. be an RFID reader, an optical reader, or a reader that detects a position pattern of magnets.

If the sensor programming device 110 comprises a passive RFID tag comprising the sensor programming instructions, and the corresponding sensor device 120 comprises an RFID reader 122, the automatic transferring of the unique set of sensor programming instructions from the sensor programming device 110 to the sensor device 120 may comprise using the RFID reader 122 to activate the RFID tag and read the unique set of sensor programming instructions. The RFID tag preferably contains the programming that the sensor device 120 needs to perform the necessary functions in the particular sensor position 125.

If the sensor programming device 110 comprises a visual code comprising sensor programming instructions, such as e.g. a bar code or a QR tag, and the corresponding sensor device 120 comprises an optical reader 122, the automatic transferring of the unique set of sensor programming instructions from the sensor programming device 110 to the sensor device 120 may comprise using the optical reader 122 to read the unique set of sensor programming instructions. The visual code preferably contains the programming that the sensor device 120 needs to perform the necessary functions in the particular sensor position 125.

If the sensor programming device 110 comprises a number of magnets, where the position pattern of the magnets comprises the sensor programming instructions, and the corresponding sensor device 120 comprises a reader 122 that detects the position pattern of the magnets, the automatic transferring of the unique set of sensor programming instructions from the sensor programming device 110 to the sensor device 120 may comprise reading the unique set of sensor programming instructions by detecting the position pattern of the magnets. The position pattern of the magnets preferably contains the programming that the sensor device 120 needs to perform the necessary functions in the particular sensor position 125.

The programming is preferably effected by the reader 122 automatically reading the unique set of sensor programming instructions from the sensor programming device 110.

The programming is preferably effected automatically at each system start. However, there may be a sensor initialization routine that may instead be run at any suitable point in time. Alternatively or additionally, there may be sensor initialization means on each sensor device 120, so that the unique set of sensor programming instructions are automatically transferred from the sensor programming device 110 to the sensor device 120 when e.g. a button or a switch on the sensor device 120 is actuated.

The sensor device 120 is preferably a programmable sensor device. Such a programmable sensor device normally comprises software that handles the various sensor functionalities. However, when such a programmable sensor device is connected to a system, it must be configured to communicate with the system.

EP2816813 describes a universal sensor that is enabled to receive context specific operating instructions via a short range communication network. The sensor type in EP2816813 may e.g. be accelerometer, gyroscope, GPS device, humidity sensor, temperature sensor, barometer sensor, altitude sensor, magnetic sensor, time sensor, pressure sensor, weight sensor, sound-level sensor, microphone sensor, visual sensor, camera, video-camera, IR-camera, UV-camera. A sensor device 120 mounted in a sensor position 125 on the agricultural machine 100 may e.g. comprise the universal sensor described in EP2816813.

A sensor device 120 mounted in a sensor position 125 on the agricultural machine 100 may e.g. comprise a radar sensor, an IR sensor, an angle sensor, an accelerometer, and/or any of the other sensor types described in EP2816813. There may of course also be other types of sensor devices 120 on the agricultural machine 100.

EP2846619, EP2934082, EP3065528, EP3082393, EP3100211, EP3232760 and US2017204716 show examples of the use of sensors in agricultural machines.

A sensor device 120 mounted in a sensor position 125 on the agricultural machine 100 may e.g. measure at least one of a speed of movement of the agricultural machine 100, a level of substance filling in a tank 150 of the agricultural machine 100, a speed of feeding out substance from the agricultural machine 100, and/or a distance to surrounding objects, or any other of the parameters measured using the sensors described in EP2846619, EP2934082, EP3065528, EP3082393, EP3100211, EP3232760 or US2017204716. There may of course also be other types of sensor devices 120, measuring other parameters, on the agricultural machine 100.

Many substances in tanks 150 of agricultural machines 100 are not of the kind that automatically levels to a plane surface—this applies to e.g. fertilizer and seed. This means that the level of substance filling in a tank 150 of the agricultural machine 100 may be difficult to measure without using weighing cells in the tank 150. However, the level of substance filling in the tank 150 may be measured e.g. by using radar sensors positioned at various positions in the tank 150.

Figure 4:
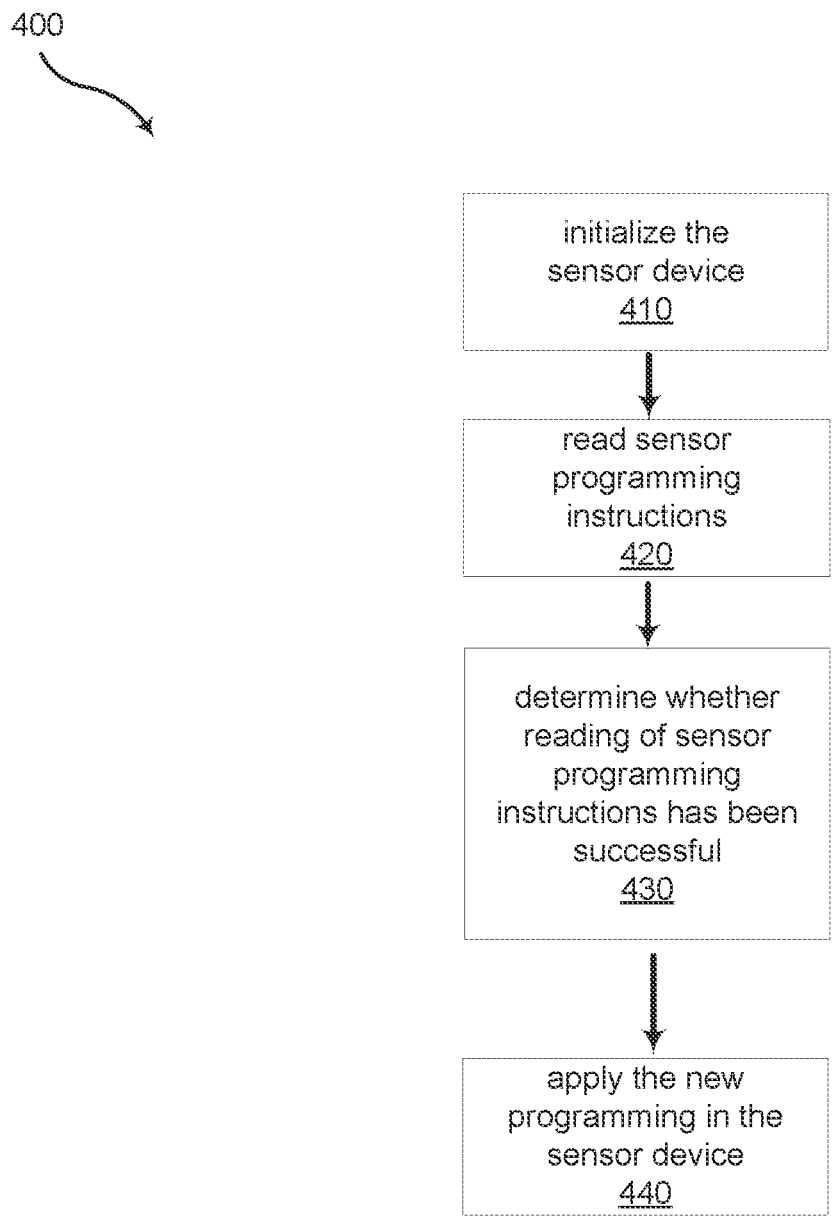
FIG. 4 schematically illustrates a method for programming a sensor device using a sensor programming device, in accordance with one or more embodiments described herein.

FIG. 4 schematically illustrates a method for programming a sensor device 120 using a sensor programming device 110 that may e.g. comprise a passive RFID tag comprising the unique set of sensor programming instructions. The passive RFID tag may e.g. be a plastic tag that may be printed with a printer and placed in a programming position 115 adjacent or next to a sensor position 125 on the agricultural implement.

The sensor programming device 110 may comprise the instructions needed by the sensor device 120. This information may e.g. be:
- Base ID (listen to all message staring with 0x10 and communicate back with 0x11)
- Function group
- Instance ID (what is the unique number of the sensor device 120)
- What type of sensor to use (radar, angular sensor, temperature, accelerometer etc.)
- What mode of sensor to use (if several)
- Parameters for the sensor device
- Number of readings per time unit
- Filtering of reported result
- Regulator parameters The programming may thus tell the sensor device 120 e.g. what it is expected to measure and within what range, message IDs, report frequency, and whether there are any thresholds that should trigger alarms. A programming may thus e.g. be "Use radar to monitor the flow through a pipe. The range is 28 mm. Report any messages using CAN-ID 0x40111. Report status each second". This programming may be effected by a code that is comprised in the unique set of sensor programming instructions. As explained above, different unique sets of sensor programming instructions may differ only in the unique Instance ID (sensor identification code or number) comprised in the unique set of sensor programming instructions.

The method 400 may comprise:

Step 410: Initializing the sensor device 120, by starting the system or by separately running a sensor initialization routine, e.g. by actuating sensor initialization means such as a button or a switch on the sensor device 120. The sensor device 120 is preferably programmed to automatically initialize at power-up, at any suitable point in time, and/or when sensor initialization means is actuated.

Step 420: Using the reader 122 to read the sensor programming instructions, e.g. by activating the RID tag and reading the sensor programming instructions with an RFID reader. The range of the reader 122 is preferably short, so that there is a low risk that the reader 122 accidentally reads the sensor programming instructions from the wrong sensor programming device 110 (e.g. RFID tag). The programming position 115 is preferably adjacent the sensor position 125, which means that the programming position 115 is close enough to ensure that a reader 122 arranged in a sensor device 120 that is mounted in the sensor position 125 is able to read the unique set of sensor programming instructions from the sensor programming device 110 that is mounted in the programming position 115, without the risk of accidentally reading the sensor programming instructions from a sensor programming device 110 mounted in another programming position 115. There may also be programming in the reader 122 to ensure that the highest signal is always selected.

Step 430: Determining whether the reading of the sensor programming instructions has been successful. The sensor device 120 may be programmed to automatically re-initialize if the reading has not been successful.

Step 440: Applying the new programming in the sensor device 120.

When the method 400 has been carried out, the sensor device 120 has been programmed with the unique set of sensor programming instructions from the sensor programming device 110.

Figure 5:
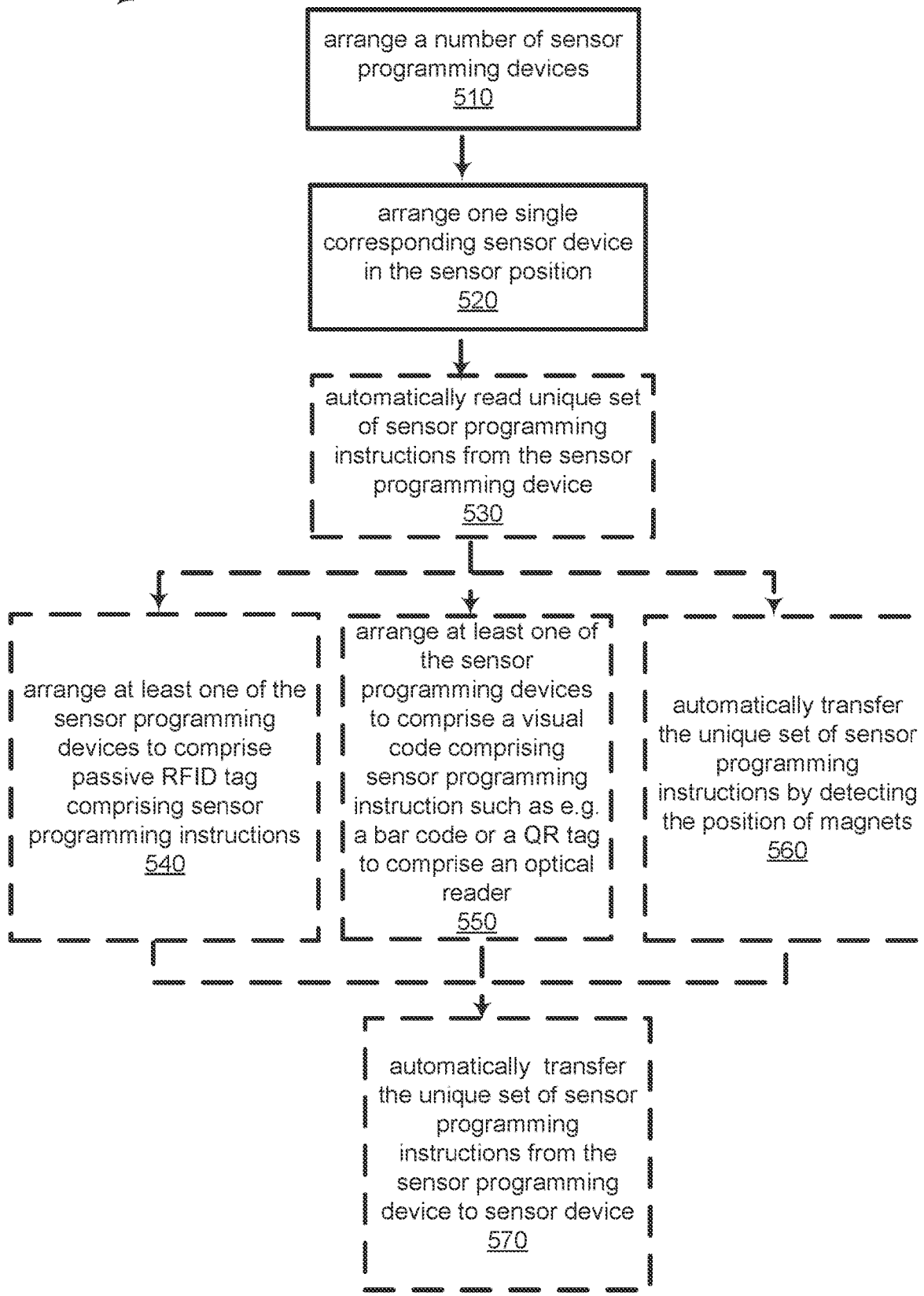
FIG. 5 schematically illustrates a method for an agricultural machine, in accordance with one or more embodiments described herein.

FIG. 5 schematically illustrates a method 500 for arranging sensor devices 120 on an agricultural machine. The method 500 may comprise:

Step 510: Arranging a number of sensor programming devices 110, each comprising a unique set of sensor programming instructions, in a programming position 115 adjacent a sensor position 125 for a corresponding sensor device 120.

Step 520: For each sensor programming device 110, arranging one single corresponding sensor device 120 in the sensor position 125.

Step 570: For each sensor programming device 110, automatically transferring the unique set of sensor programming instructions from the sensor programming device 110 to the sensor device 120, so that if a sensor device 120 is moved from one sensor position 125 to another sensor position 125, it automatically receives a different set of programming instructions.

In embodiments, the automatic transferring 570 of the unique set of sensor programming instructions from a sensor programming device 110 to a corresponding sensor device 120 takes place when the agricultural machine 100 is started.

In embodiments, each sensor device 120 comprises a radar sensor, an IR sensor, an angle sensor, and/or an accelerometer. There may of course also be other types of sensor devices 120 on the agricultural machine 100.

In embodiments, each sensor device 120 measures at least one of a speed of movement of the agricultural machine 100, a level of substance filling in a tank 150 of the agricultural machine 100, a speed of feeding out substance from the agricultural machine 100, and/or a distance to surrounding objects. There may of course also be other types of sensor devices 120, measuring other parameters, on the agricultural machine 100.

In embodiments, the unique set of sensor programming instructions in each sensor programming device 110 is fixed and cannot not be updated by any system in the agricultural machine 100.

In embodiments, the method 500 further comprises at least one of the following:

Step 530: Arranging a sensor device 120 to comprise a reader 122 that automatically reads the unique set of sensor programming instructions from the sensor programming device 110.

Step 540: Arranging at least one of the sensor programming devices 110 to comprise a passive RFID tag comprising sensor programming instructions, and the corresponding sensor device 120 to comprise an RFID reader 122. The automatic transferring 570 of the unique set of sensor programming instructions may then comprise activating the RFID tag and reading the sensor programming instructions using the RFID reader 122.

Step 550: Arranging at least one of the sensor programming devices 110 to comprise a visual code comprising sensor programming instructions, such as e.g. a bar code or a QR tag, and the corresponding sensor device 120 to comprise an optical reader 122. The automatic transferring 570 of the unique set of sensor programming instructions may then comprise reading the sensor programming instructions using the optical reader 122.

Step 560: Arranging at least one of the sensor programming devices 110 to comprise a number of magnets, where the position pattern of the magnets comprises the sensor programming instructions, and the corresponding sensor device 120 to comprise a reader 122 that detects the position pattern of the magnets. The automatic transferring 570 of the unique set of sensor programming instructions may then comprise reading the sensor programming instructions by detecting the position pattern of the magnets.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. For example, some of the sensors on the agricultural machine 100 may be regular, specific sensors, so that only some of the sensors are sensor devices 120 according to this disclosure. Accordingly, the scope of the invention is defined only by the claims.

The invention claimed is:

1. Agricultural machine comprising sensors, characterized in that the agricultural machine comprises a number of sensor programming devices, each comprising a unique set of sensor programming instructions defining what the sensor is expected to measure, and is arranged to comprise one single corresponding sensor device for each of the sensor programming devices, wherein each sensor programming device is mounted in a programming position adjacent a sensor position for the corresponding sensor device, and each sensor device is arranged to be mounted in the sensor position and automatically receive the unique set of sensor programming instructions from the corresponding sensor programming device, so that if a sensor device is moved from one sensor position to another sensor position, it automatically receives a different set of programming instructions defining what the sensor is expected to measure.

2. Agricultural machine according to claim 1, wherein a sensor device that is arranged to be mounted in a sensor position is arranged to receive the unique set of sensor programming instructions from the corresponding sensor programming device automatically when the agricultural machine is started.

3. Agricultural machine according to claim 1, wherein a sensor device that is arranged to be mounted in a sensor position comprises a reader that automatically reads the unique set of sensor programming instructions from the sensor programming device.

4. Agricultural machine according to claim 1, wherein at least one of the sensor programming devices comprises a passive RFID tag comprising the sensor programming instructions, and the corresponding sensor device comprises an RFID reader that activates the passive RFID tag and reads the unique set of sensor programming instructions.

5. Agricultural machine according to claim 1, wherein at least one of the sensor programming devices comprises a visual code comprising the sensor programming instructions, and the corresponding sensor device comprises an optical reader that reads the unique set of sensor programming instructions, and wherein the sensor programming instructions are accessed by reading a bar code and/or a QR tag.

6. Agricultural machine according to claim 1, wherein at least one of the sensor programming devices comprises a number of magnets, where the position pattern of the magnets comprises the sensor programming instructions, and the corresponding sensor device comprises a reader that detects the position pattern of the magnets and thereby reads the unique set of sensor programming instructions.

7. Agricultural machine according to claim 1, wherein each of the sensor devices comprises a radar sensor, an IR sensor, an angle sensor, and/or an accelerometer.

8. Agricultural machine according to claim 1, wherein each of the sensor devices measures at least one of a speed of movement of the agricultural machine, a level of substance filling in a tank of the agricultural machine, a speed of feeding out substance from the agricultural machine, and/or a distance to surrounding objects.

9. Agricultural machine according to claim 1, wherein the unique set of sensor programming instructions in each sensor programming device is fixed and cannot not be updated by any system in the agricultural machine.

10. Method for arranging sensor devices on an agricultural machine, characterized in that the method comprises:
arranging a number of sensor programming devices, each comprising a unique set of sensor programming instructions defining what the sensor is expected to measure, in a programming position adjacent a sensor position for a corresponding sensor device;
for each sensor programming device, arranging one single corresponding sensor device in the sensor position; and
for each sensor programming device, automatically transferring the unique set of sensor programming instructions from the sensor programming device to the sensor device, so that if a sensor device is moved from one sensor position to another sensor position, it automatically receives a different set of programming instructions defining what the sensor is expected to measure.

11. Method according to claim 10, wherein the automatic transferring of the unique set of sensor programming instructions from a sensor programming device to a sensor device takes place when the agricultural machine is started.

12. Method according to claim 10, further comprising arranging a sensor device to comprise a reader that automatically reads the unique set of sensor programming instructions from the sensor programming device.

13. Method according to claim 10, further comprising arranging at least one of the sensor programming devices to comprise a passive RFID tag comprising sensor programming instructions, and the corresponding sensor device to comprise an RFID reader, wherein the automatic transferring of the unique set of sensor programming instructions comprises activating the RFID tag and reading the unique set of sensor programming instructions using the RFID reader.

14. Method according to claim 10, further comprising arranging at least one of the sensor programming devices to comprise a visual code comprising the sensor programming instructions and the corresponding sensor device to comprise an optical reader, wherein the automatic transferring of the unique set of sensor programming instructions comprises reading the unique set of sensor programming instructions using the optical reader, and wherein the sensor programming instructions are accessed by reading a bar code and/or a QR tag.

15. Method according to claim 10, further comprising arranging at least one of the sensor programming devices to comprise a number of magnets, where the position pattern of the magnets comprises the sensor programming instructions, and the corresponding sensor device to comprise a reader that detects the position pattern of the magnets, wherein the automatic transferring of the unique set of sensor programming instructions comprises reading the unique set of sensor programming instructions by detecting the position pattern of the magnets.

16. Method according to claim 10, wherein each sensor device comprises a radar sensor, an IR sensor, an angle sensor, and/or an accelerometer.

17. Method according to claim 10, wherein each sensor device measures at least one of a speed of movement of the agricultural machine, a level of substance filling in a tank of the agricultural machine, a speed of feeding out substance from the agricultural machine, and/or a distance to surrounding objects.

18. Method according to claim 10, wherein the unique set of sensor programming instructions in each sensor programming device is fixed and cannot not be updated by any system in the agricultural machine.

* * * * *